(12) United States Patent
Kelley, Jr. et al.

(10) Patent No.: US 7,086,515 B2
(45) Date of Patent: Aug. 8, 2006

(54) CLUTCH AND SYNCHRONIZER HAVING PERMANENT MAGNET ACTUATORS

(75) Inventors: William R. Kelley, Jr., Novi, MI (US); Andrew F. Joseph, Plymouth, MI (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 10/643,661

(22) Filed: Aug. 19, 2003

(65) Prior Publication Data

US 2005/0040000 A1 Feb. 24, 2005

(51) Int. Cl.
*F16D 39/00* (2006.01)

(52) U.S. Cl. .................. 192/48.3; 192/69.82; 192/84.3

(58) Field of Classification Search ............... 192/48.3, 192/53.1, 53.2, 55.2, 69.82, 69.9, 69, 69.62, 192/84.3; 310/92, 100, 103; 464/29
See application file for complete search history.

(56) References Cited

U.S. PATENT DOCUMENTS

| | | | | |
|---|---|---|---|---|
| 3,250,354 A | * | 5/1966 | Kelbel | .................. 192/53.341 |
| 3,666,064 A | * | 5/1972 | Bird et al. | .................. 192/84.3 |
| 3,726,373 A | * | 4/1973 | Miller | ........................ 192/84.3 |
| 4,825,992 A | | 5/1989 | Skrobisch | |
| 5,523,636 A | | 6/1996 | Nelson | |
| 5,531,307 A | | 7/1996 | Fechter et al. | |
| 5,609,232 A | | 3/1997 | Brownfield et al. | |
| 5,739,605 A | | 4/1998 | Lazorchak | |
| 5,848,678 A | * | 12/1998 | Johnston et al. | ........... 192/21.5 |
| 5,898,249 A | * | 4/1999 | Boggs, III | .................. 310/105 |
| 5,996,758 A | * | 12/1999 | Baxter, Jr. | ............... 192/84.31 |
| 6,208,053 B1 | | 3/2001 | Scott | |

* cited by examiner

Primary Examiner—Saul Rodriguez
(74) Attorney, Agent, or Firm—Brinks Hofer Gilson & Lione; Greg Dziegielewski

(57) ABSTRACT

A friction clutch pack utilizes permanent magnets and induction rings to actuate a ball ramp actuator which come in turn, engages the friction clutch pack to transfer torque between drive and driven members in, for example, a motor vehicle transfer case. The permanent magnets and induction rings may also be utilized as a synchronizer to urge the speeds of two rotating members into synchronism to facilitate engagement of a direct coupling i.e., a dog clutch.

9 Claims, 5 Drawing Sheets

CLUTCH AND SYNCHRONIZER HAVING PERMANENT MAGNET ACTUATORS

BACKGROUND OF THE INVENTION

The invention relates generally to actuators for friction clutch packs and synchronizers for motor vehicle driveline components and more particularly to friction clutch packs and synchronizers for motor vehicle drivelines having permanent magnet actuators.

Clutches which are activated or energized by electricity delivered to an electromagnetic coil are common components of rotary power transmission systems in both stationary applications and motor vehicles.

After torque throughput and size, one of the most significant design considerations of electromagnetic clutches, particularly in motor vehicles, is the power consumption and, more particularly, the power required to continuously engage the clutch. At a fundamental level, significant power consumption is undesirable since it causes an additional load on the vehicle electrical system which ultimately affects the fuel consumption of the vehicle. A less obvious but no less important consideration is the heat generated by the electromagnetic coil and specifically the configuration or components needed to dissipate it.

One approach to low power consumption is generally referred to as a cam or ball ramp actuated clutch. In this device, a pair of opposed circular plates having camming members or pairs of ramped recesses which receive load transferring balls separate upon relative rotation and compress an adjacent friction clutch pack which transfers drive energy or torque from a drive member to a driven member. Since the electromagnetic coil is utilized only to create drag which causes relative rotation between the members and the speed difference between the rotating members provides the energy to actuate the main clutch. Ball ramp clutches tend to exhibit relatively low power consumption.

There has been for many years and presently is continuing emphasis on motor vehicle components having low power consumption. The present invention is directed to a clutch or synchronizer which is passive and utilizes no externally supplied energy.

SUMMARY OF THE INVENTION

A friction clutch pack utilizes permanent magnets and induction rings to actuate a ball ramp actuator which, in turn, engages the friction clutch pack to transfer torque between drive and driven members in, for example, a motor vehicle transfer case. The permanent magnets and induction rings may also be utilized as a synchronizer to urge the speeds of two rotating members into synchronism to facilitate engagement of a direct coupling i.e., a dog clutch.

Thus it is an object of the present invention to provide a clutch for motor vehicle drivelines utilizing permanent magnets and induction rings.

It is a further object of the present invention to provide a synchronizer for motor vehicle drivelines utilizing permanent magnets and induction rings.

It is a still further object of the present invention to provide a clutch for motor vehicle drivelines which is passive and does not consume energy.

It is a still further object of the present invention to provide a synchronizer for motor vehicle drivelines which is passive and does not consume energy.

It is a still further object of the present invention to provide a motor vehicle driveline clutch which provides increased engagement force as the speeds between drive and driven members increases.

It is a still further object of the present invention to provide a synchronizer for motor vehicle drivelines wherein the synchronizing torque increases as the speed of drive and driven members increases.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
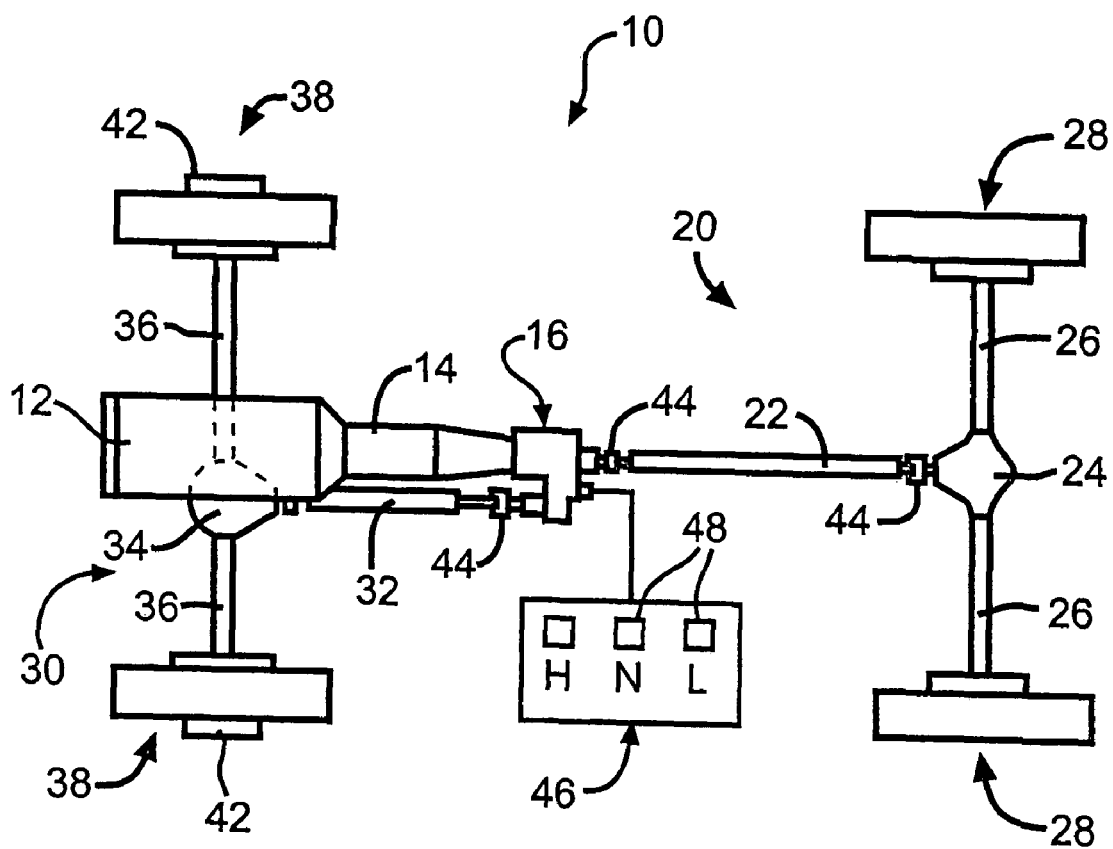
FIG. 1 is a diagrammatic view of a motor vehicle driveline having a transfer case incorporating the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The transmission 14 may either be an automatic or manual type. The output of the transmission 14 directly drives a transfer case assembly 16 which provides motive power to a primary or rear driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be disposed between the pair of front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components. A control console 46 which is preferably disposed within convenient reach of the vehicle operator includes a switch or a plurality of individual switches or push buttons 48 which facilitate selection of the operating mode of the transfer case assembly 16 as will be further described below.

The foregoing and following description relates to a vehicle wherein the rear driveline 20 functions as the primary driveline, i.e., it is engaged and operates substantially all the time and, correspondingly, the front driveline 30 functions as the secondary driveline, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary driveline 20 is disposed at the front of the vehicle and the secondary driveline 30 is disposed at the rear of the vehicle. Such designations "primary" and "secondary" thus broadly and properly characterize the function of the individual drivelines rather than their specific locations.

Figure 2:
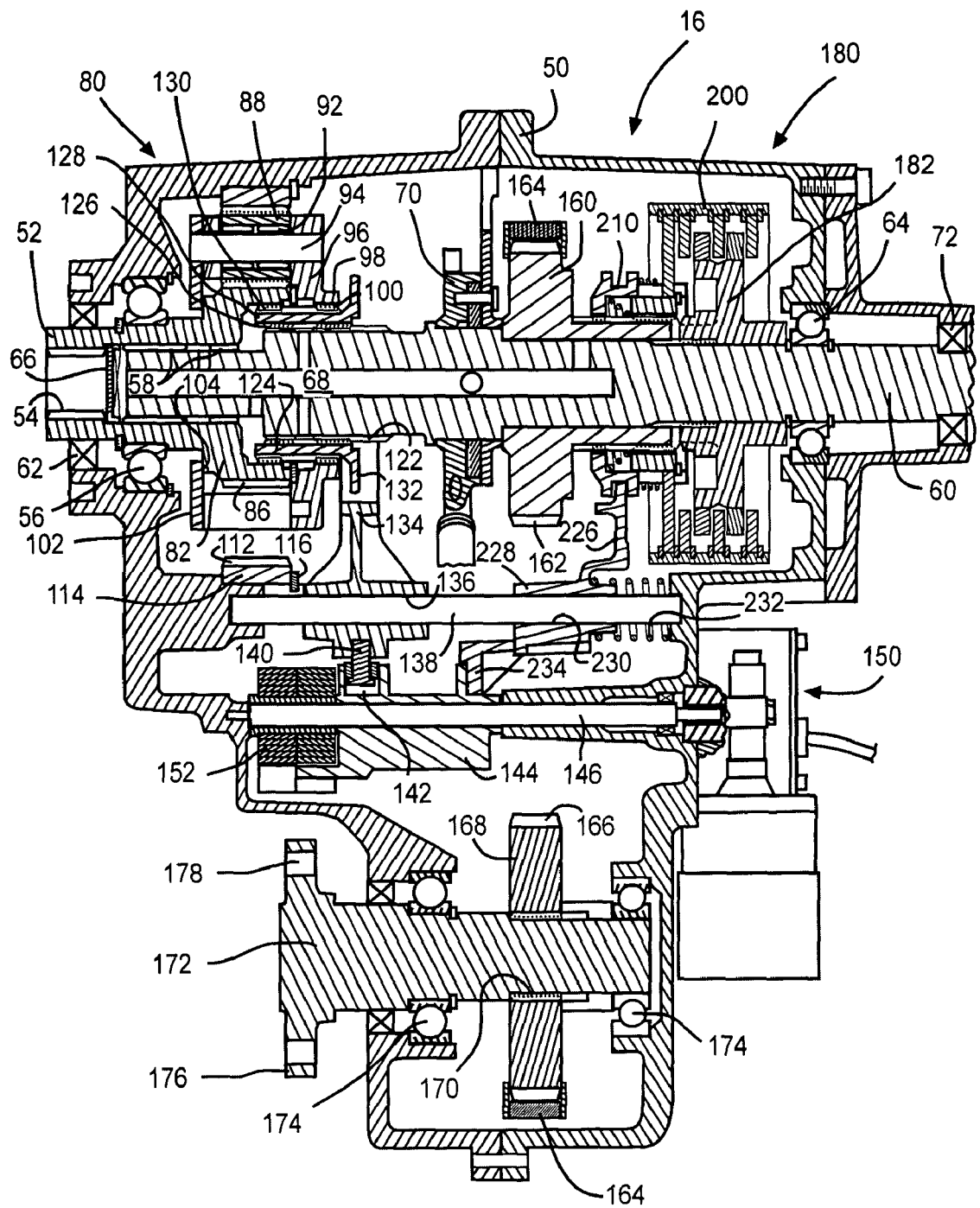
FIG. 2 is a full, sectional view of a motor vehicle transfer case incorporating a permanent magnet synchronizer according to the present invention.

Referring now to FIGS. 1 and 2, the transfer case assembly 16 incorporating the present invention includes a multiple piece, typically cast, metal housing assembly 50 having planar and circular sealing surfaces, openings for shafts and bearings and various recesses, shoulders, flanges, counter bores and the like to receive various components and assemblies of the transfer case assembly 16. An input shaft 52 includes female or internal splines or gear teeth 54 or other suitable structure which drivingly couple an output of the transmission 14 (illustrated in FIG. 1) to the input shaft 52. The input shaft 52 is rotatably supported externally by an anti-friction bearing such as a ball bearing assembly 56 and internally by an anti-friction bearing such as roller bearing assemblies 58. The roller bearing assemblies 58 are disposed upon a reduced diameter portion of a primary output shaft 60. An oil seal 62, positioned between the input shaft 52 and the housing assembly 50, provides an appropriate fluid tight seal therebetween.

The opposite end of the output shaft 60 is supported by an anti-friction bearing such as a ball bearing assembly 64. An end cap or seal 66 closes off the end of an axial passageway 68 in the primary output shaft 60. A gerotor pump 70 will typically be utilized to provide a flow of lubricating and cooling fluid to the axial passageway 68 which is thence distributed through a plurality of radial ports in the primary output shaft 60 to the components of the transfer case assembly 16. An oil seal 72 positioned between the housing 50 and the output shaft 60 achieves a fluid tight seal therebetween.

The transfer case assembly 16 includes a planetary gear speed reduction assembly 80. The planetary gear speed reduction assembly 80 includes a sun gear 82 which may integrally form with the input shaft 52. The sun gear 82 includes gear teeth 86 which are in constant mesh with a plurality of pinion or planet gears 88. The planet gears 88 may be rotatably disposed upon roller bearings 92 which in turn are supported by fixed stub shafts 94 or the pinion gears 88 may be rotatably supported directly upon the stub shafts 94, if desired. The stub shafts 94 are retained and secured within a planet carrier 96 which includes a bell shaped extension 98 and male or external splines or gear teeth 100. The planet carrier 96 is also supported by a circular disc 102 which engages a shoulder 104 on the input shaft 52.

The plurality of pinion or planet gears 88 are in constant mesh with gear teeth 112 of a stationary ring gear 114 which is secured within the housing 50 by, for example, a snap ring 116.

The output shaft 60 includes a set of male or external splines or gear teeth 122 in a region adjacent the planetary gear speed reduction assembly 80. Received upon the male spines 122 and bi-directionally translatable there along is a clutch collar 124 having complementarily configured internal or female splines 126. The clutch collar 124 includes male splines or gear teeth 128 which, in the position illustrated in FIG. 2, engage complementarily configured female or internal splines or gear teeth 130 on an interior region of the sun gear 82 to provide direct drive. As the clutch collar 124 slides to the right, it passes through a neutral region and then the male splines or gear teeth 128 engage complementarily configured male splines or gear teeth 100 on the bell shaped extension 98 of the planet carrier 96. The clutch collar 124 includes a flange 132 which is engaged by a complementarily configured portion of a shift fork 134. The shift fork 134 includes a through aperture 136 which receives an elongate shift rail 138. The shift fork 134 also includes a follower 140 which is received within a helical track 142 of a cam 144. The cam 144 is rotated by a bi-directionally rotatable shift rail 146 driven by an electric motor drive assembly 150 through an energy storing spring 152. Bi-directional rotation of the shift rail 146 translates the shift fork 134 and the clutch collar 124 through the three positions described directly above to achieve direct drive, neutral and reduced speed or low gear drive.

The transfer case 16 also includes a chain drive sprocket 160 which is freely rotatably disposed upon the output shaft 60 and includes chain drive teeth 162 which engage a drive chain 164. The drive chain 164 engages chain teeth 166 of a driven chain sprocket 168. The driven chain sprocket 168 is secured by interengaging splines 170 to a secondary output shaft 172. The secondary output shaft 170 is preferably supported upon a pair of anti-friction bearings such as the roller bearing assemblies 174. The secondary output shaft 172 may include a flange 176 which defines a plurality of parallel, spaced apart apertures 178 which facilitate connection to other components of the secondary driveline (not illustrated).

Figure 3:
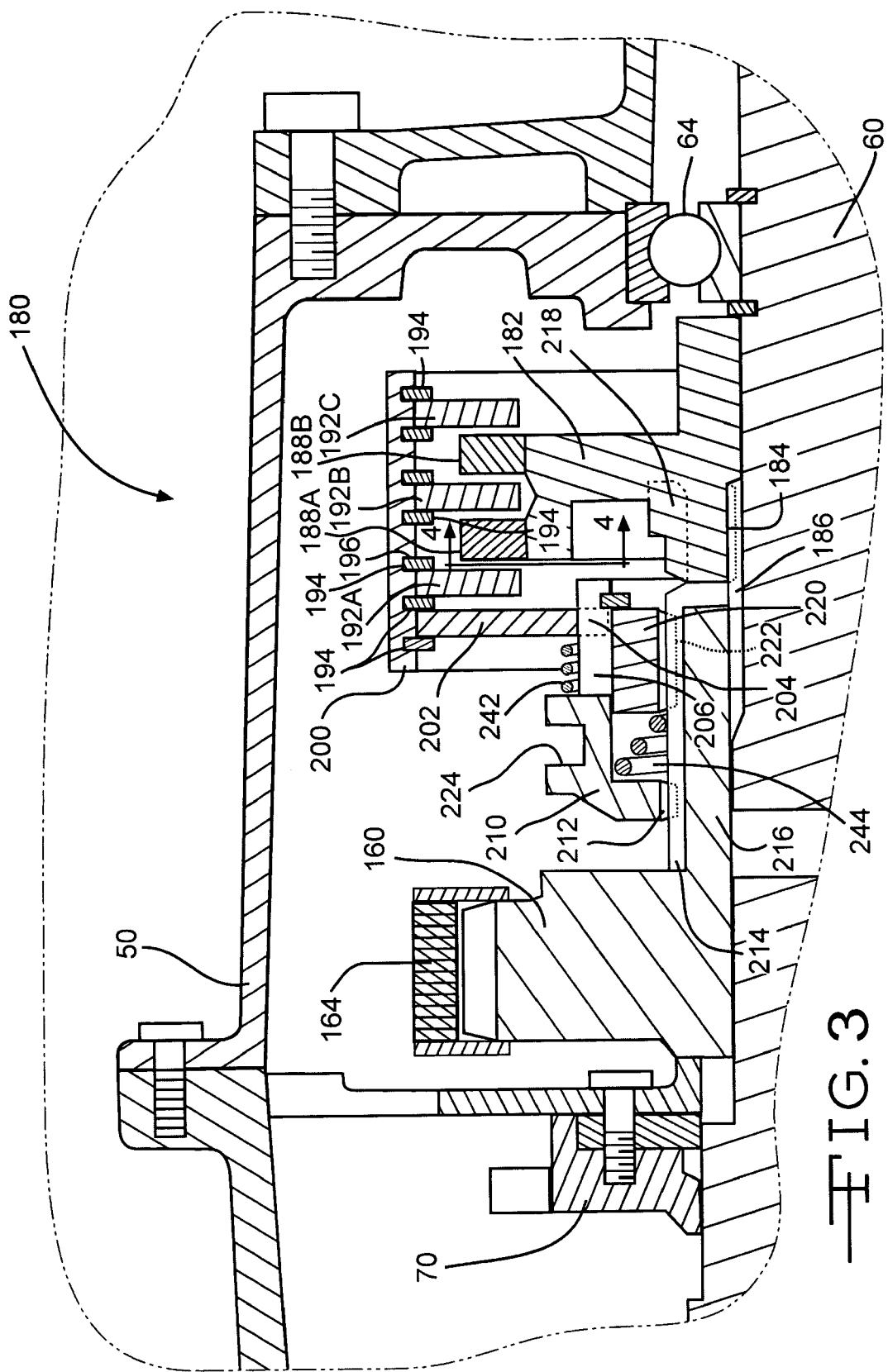
FIG. 3 is an enlarged, fragmentary, sectional view of a permanent magnet synchronizer according to the present invention.

Referring now to FIGS. 2 and 3, a synchronizer assembly 180 according to the present invention includes a drive collar 182 which is coupled to the primary output shaft 60 by internal or female splines or gear teeth 184 which engage complementarily configured male splines or gear teeth 186 formed in, the primary output shaft 60. Integrally formed with the collar 182 or fabricated as separate components are a pair of spaced apart magnet rings 188A and 188B which are secured to and rotate with the collar 182.

Figure 4:
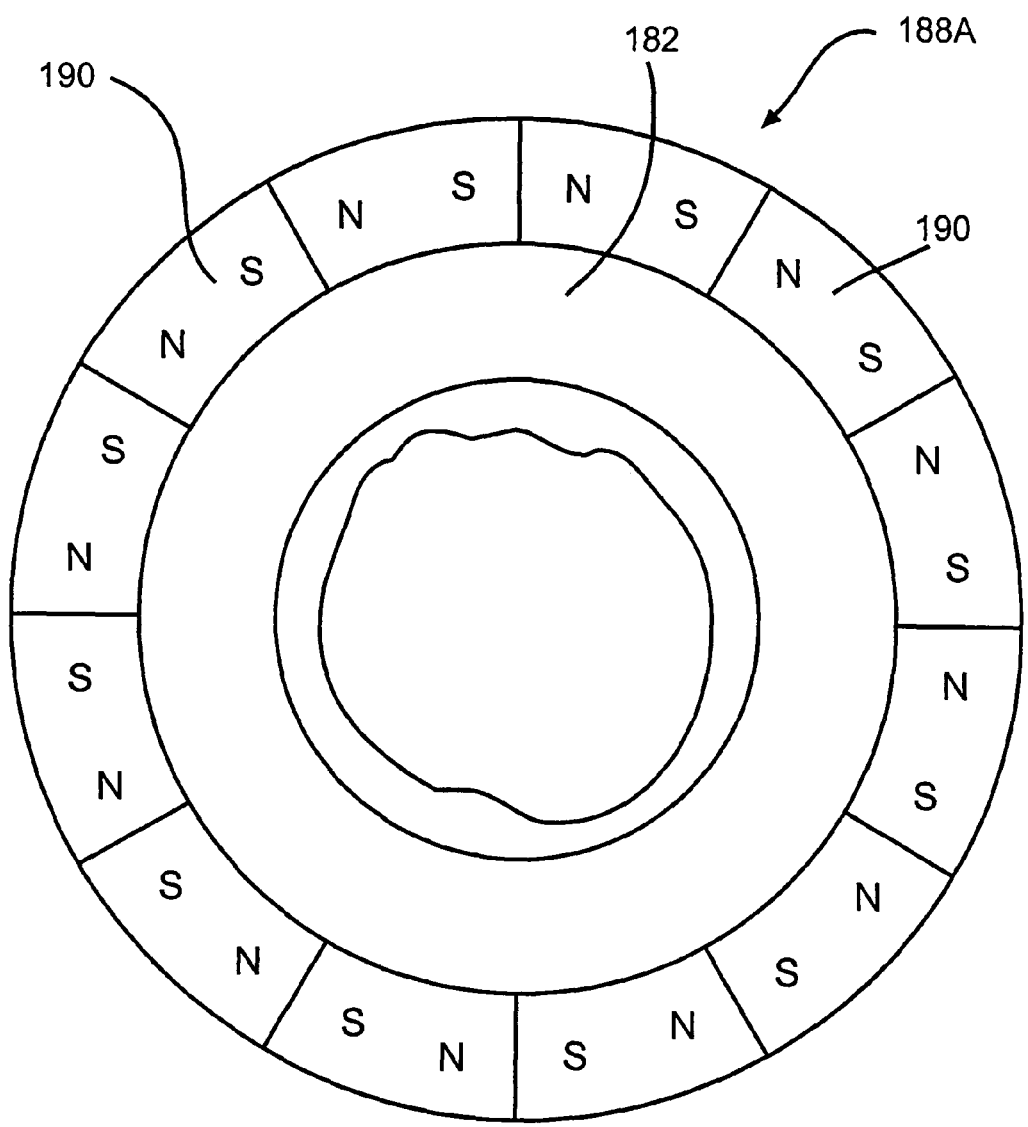
FIG. 4 is a full, sectional view of a magnet ring of a synchronizer according to the present invention taken along line 4—4 of FIG. 3.

As illustrated in FIG. 4, the magnet rings 188A and 188B define a plurality of individual arcuate magnets 190 arranged with the r north/south poles in alternation.

As illustrated in FIGS. 2 and 3, the magnet rings 188A and 188B are interleaved with three induction rings 192A, 192B and 192C. Preferably, the induction rings 192A, 192B and 192C are fabricated of copper. The induction rings 192A, 192B and 192C are maintained in their spaced apart axial positions, interleaved with the magnet rings 188A and 188B, by a plurality of snap rings 194 which seat within appropriately spaced circumferentially grooves or channels 196 formed on the interior surface of an annulus 200. The annulus 200 is held in position concentric with the primary output shaft 60 by a circular plate 202 also retained by snap ring 194. The circular plate 202 includes internal splines or gear teeth 204 which are complementary to and engage male splines or gear teeth 206 on a clutch collar 210. The clutch collar 210 includes internal or female splines or gear teeth 212 which are complementary to and mate with a set of male or exterior splines or gear teeth 214 formed on an axially extending portion 216 of the chain drive sprocket 160.

The drive collar 182 also includes a set of male splines or gear teeth 218 which are complementary to the female or internal spines or gear teeth 212 on the clutch collar 210. A shift collar 220 includes splines or gear teeth 222 which are complementary to and engage the splines 214 on the extension 216 of the chain drive sprocket 160 and are also complementary to the male or extruded splines or gear teeth 218 on the drive collar 182. The clutch collar 210 includes a circumferential groove or channel 224 which receives a complementarily configured portion of a shift fork 226 illustrated in FIG. 2. The shift fork 226 includes an elongate body 228 having a through passageway 230 which slidably receives the shift rail 138. A compression spring 232 biases the shift fork 226 to the left as illustrated in FIG. 2. A cam follower 234 and urges bidirectional translation of the shift fork 226 and clutch collar 210 as the cam 144 rotates.

Referring again to FIG. 3, a first compression spring 242 biases the clutch collar 210 to the left as illustrated in FIG. 3. A second compression spring 244 biases the shift collar 220 in the opposite direction as it biases the clutch collar 210.

In operation, the magnet rings 188A and 188B rotate with the primary output shaft 60 while the induction rings 192A, 192B and 192C rotate with the clutch drive sprocket 160 and the secondary driveline 30. A speed differential between these permanent rotating elements is resisted by the magnetic flux passing between the magnet rings 188A and 188B and the copper induction rings 192A, 192B and 192C. The drag so created attempts to minimize and eliminate the speed difference between these rotating elements. The synchronism thereby achieved facilitates translation of the shift collar 220 by the clutch collar 210 as commanded by the electric motor drive assembly 150 and coupling between the chain drive sprocket 160 and its extension 216 with the drive collar 182 as the shift collar 220 engages both the splines 214 and 218.

Figure 5:
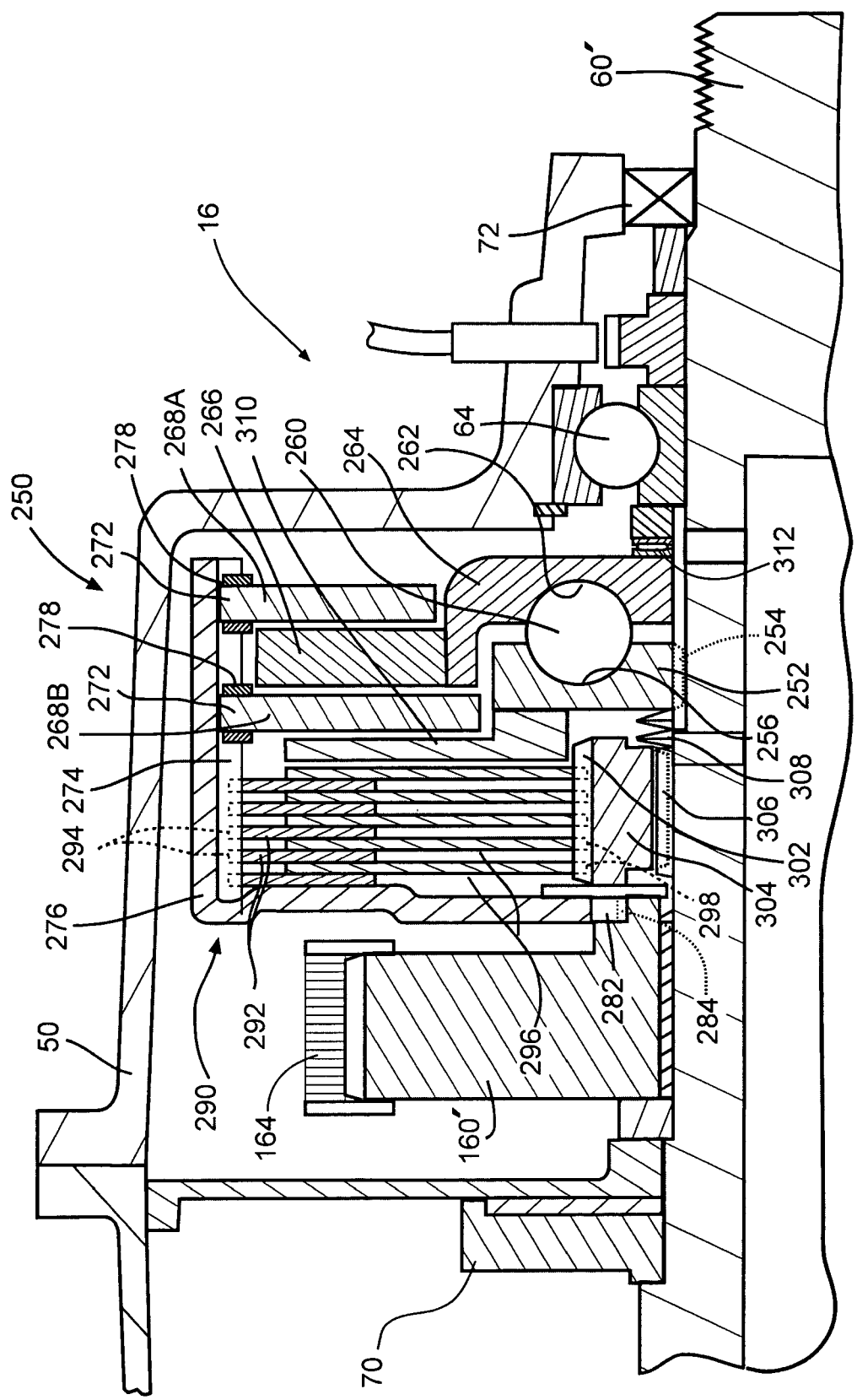
FIG. 5 is an enlarged, fragmentary, sectional view of a motor vehicle driveline ball ramp clutch having a permanent magnet and induction ring actuator.

Referring now to FIG. 5, a permanent magnet actuator 250 may also be utilized in connection with a ball ramp type clutch operator to engage a friction disc pack mechanically disposed, for example, between the primary and secondary outputs of a transfer case. The permanent magnet actuator 250 includes a first circular plate 252 coupled by interengaging splines 254 or other positive connection to the primary output shaft 60'. The first circular plate 252 defines a plurality of circumferentially spaced apart ramped recesses 256 which receive a like plurality of load transferring balls 260. The load transferring balls 260 are trapped within opposed complementarily configured ramped recesses 262 formed in an opposing face of a second circular plate or member 264 which is freely rotatably disposed upon the primary output shaft 60'. The second circular member 264 extends radially outwardly and includes a magnet ring portion 266 which is for all intents and purposes identical to the magnet rings 188A and 188B discussed above with regard to the synchronizer. That is, a plurality of actuate permanent magnets are spaced end to end circumferentially about the magnet ring 266.

On both sides of the magnet ring 266 are copper induction rings 268A and 268B. The copper induction rings 268A and 268B include male splines or gear teeth 272 which engage complementarily configured female splines or gear teeth 274 formed on the inside surface of a clutch bell housing 276. A plurality of snap rings 278 maintain the proper axial positions of the induction rings 268A and 268B. The clutch bell housing 276 includes a set of female spines, gear teeth or lugs 282 which mate with complementarily configured male splines, gear teeth or lugs 284 formed on a chain drive sprocket 160'. Contained within the clutch bell housing 276 is a friction clutch pack assembly 290. The friction clutch pack assembly 290 includes a first plurality of larger clutch plates or discs 292 having external or male splines 294 which engage the female splines 274 on the inner surface of the clutch bell housing 276. Interleaved with the first, larger diameter plurality of clutch plates or discs 292 is a second plurality of smaller diameter clutch plates or discs 296 having internal or female splines 298 which engage with complementarily configured male or external splines 302 on a clutch hub 304. The clutch hub 304 is coupled by interengaging splines 306 to and rotates with the primary output shaft 60. One or a plurality of bell or wave washers 308 provide a restoring force to drive the first circular plate 252 to the right as illustrated in FIG. 5. An apply plate 310 is disposed between the first circular plate 252 and the friction clutch pack 290. Finally, a thrust bearing 312 disposed between the second circular member 264 and the ball bearing assembly 64 maintains the axial position of the second circular member 264.

In operation, it will be appreciated that the second circular member 264 including the permanent magnet ring 266 rotates with the primary output shaft 60' whereas the copper induction rings 268A and 268B rotate with the clutch bell housing 276, the chain drive sprocket 160' and the other components of the secondary driveline 30 illustrated in FIGS. 1 and 2. As the speed difference increases, increasing drag is created by the action of the magnetic flux generated by the magnet ring 266 and the induction rings 268A and 268B. This causes relative rotation between the first circular plate 252 and the second circular member 264 causing the load transferring balls 260 to ride up the ramped recesses 256 and 262, thereby driving the first circular member 252 toward the apply plate 310 and compressing the friction clutch pack assembly 290. Compression of the friction clutch pack assembly 290 transfers torque between the primary output shaft 60' and the chain drive sprocket 160' and other components of the secondary driveline 30.

In both the synchronizer assembly 180 and the permanent magnet actuator 250, a relatively small number of interleaved magnet rings and induction rings are disclosed. It will be appreciated that if greater magnetic coupling between the rotating members is desired, greater numbers of magnet rings and induction rings may be utilized. For example, five magnets rings and six induction rings, or more or fewer, may be utilized.

The foregoing disclosure is the best mode devised by the inventors for practicing this invention. It is apparent however, that devices incorporating modifications and variations will be obvious to one skilled in the art of electromagnetic clutch assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A synchronizer for facilitating engagement of rotatable members comprising, in combination,
   a first rotatable member having axially extending engageable teeth,
   a second rotatable member disposed adjacent said first rotatable member and having axially extending engageable teeth,
   a clutch collar spring biased toward said second member, having teeth engaging said engageable teeth on said first member and disposed for axial motion therealong, said axial motion achieving engagement of said teeth with said engageable teeth on said second member,
   a bi-directionally translatable shift fork engaging said collar,
   a plurality of permanent magnets coupled to said second member for rotation therewith, and
   an induction member disposed adjacent said permanent magnets and coupled to said clutch collar for rotation therewith.

2. The synchronizer for facilitating engagement of rotatable members of claim 1 further including a transfer case having primary and secondary outputs and wherein said first rotatable member is coupled to said secondary output and said second rotatable member is coupled to said primary output.

3. The synchronizer for facilitating engagement of rotatable members of claim 1 wherein said plurality of permanent magnets are arranged end to end and coupled to said second rotatable member.

4. The synchronizer for facilitating engagement of rotatable members of claim 1 wherein said clutch collar is spring biased toward said second member.

5. The synchronizer for facilitating engagement of rotatable members of claim 1 wherein said second rotatable member is splined to a primary output shaft.

6. A synchronizer and clutch for achieving engagement of rotatable members comprising, in combination,
   a first rotatable member disposed on an axis and having teeth,
   a second rotatable member disposed on said axis adjacent said first rotatable member and having teeth,
   a spring biased clutch collar engaging and driven by said teeth on said first member and disposed for motion along said axis and engagement with said teem on said second rotatable member,
   a bi-directionally translatable shift fork,
   at least one permanent magnet coupled to said second rotatable member for rotation therewith, and
   an induction member disposed adjacent said permanent magnet and operably coupled to said first rotatable member for rotation therewith.

7. The synchronizer and clutch for achieving engagement of rotatable members of claim 6 further including a transfer case having primary and secondary outputs and wherein said first rotatable member is coupled to said secondary output and said second rotatable member in coupled to said primary output.

8. The synchronizer and clutch for achieving engagement of rotatable members of claim 6 having a plurality of permanent magnets arranged end to end and coupled to said second rotatable member.

9. The synchronizer and clutch for achieving engagement of rotatable members of claim 6 further including a compression spring for biasing said clutch collar toward said second member.

* * * * *

UNITED STATES PATENT AND TRADEMARK OFFICE
CERTIFICATE OF CORRECTION

PATENT NO. : 7,086,515 B2  Page 1 of 1
APPLICATION NO. : 10/643661
DATED : August 8, 2006
INVENTOR(S) : William R. Kelley, Jr. et al.

It is certified that error appears in the above-identified patent and that said Letters Patent is hereby corrected as shown below:

<u>In the Claims</u>

Column 8, in claim 6, line 6, immediately after "and having teeth" delete "." (period) and substitute --,-- (comma) in its place.

Column 8, in claim 6, line 9, after "engagement with said" delete "teem" and substitute --teeth-- in its place.

Column 8, in claim 6, line 11, immediately after "shift fork" delete "." (period) and substitute --,-- (comma) in its place.

Signed and Sealed this

Fourth Day of March, 2008

JON W. DUDAS
*Director of the United States Patent and Trademark Office*